United States Patent
Jung

(10) Patent No.: US 7,132,202 B2
(45) Date of Patent: Nov. 7, 2006

(54) MASK FOR LASER IRRADIATION, METHOD OF MANUFACTURING THE SAME, AND APPARATUS FOR LASER CRYSTALLIZATION USING THE SAME

(75) Inventor: Yun-Ho Jung, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 267 days.

(21) Appl. No.: 10/704,749

(22) Filed: Nov. 12, 2003

(65) Prior Publication Data

US 2004/0096753 A1    May 20, 2004

(30) Foreign Application Priority Data

Nov. 18, 2002   (KR) ...................... 10-2002-0071705

(51) Int. Cl.
*G01F 9/00* (2006.01)
(52) U.S. Cl. ......................................................... 430/5
(58) Field of Classification Search .................... 430/5, 430/330; 438/584; 359/618
See application file for complete search history.

*Primary Examiner*—S. Rosasco
(74) *Attorney, Agent, or Firm*—McKenna Long & Aldridge LLP

(57) ABSTRACT

A mask for laser irradiation includes a base substrate, a laser beam shielding pattern on a first surface of the base substrate, wherein the laser beam shielding pattern is made of an opaque metallic material and has laser beam transmitting portions spaced apart from each other, and an anti-thermal oxidation layer covering the laser beam shielding pattern, wherein a second surface of the base substrate is an incident surface of a laser beam.

24 Claims, 10 Drawing Sheets irradiation direction of laser beam

MASK FOR LASER IRRADIATION, METHOD OF MANUFACTURING THE SAME, AND APPARATUS FOR LASER CRYSTALLIZATION USING THE SAME

This application claims the benefit of Korean Patent Application No. 2002-71705, filed in Korea on Nov. 18, 2002, which is hereby incorporated by reference for all purposes as if fully set forth herein.

BACKGROUND OF THE INVENTION

1. Field of the Invention

The present invention relates to a method of crystallizing amorphous silicon. More particularly, the present invention relates to a mask for laser irradiation using sequential lateral solidification, a method of manufacturing the same, and an apparatus for laser crystallization using the same.

2. Discussion of the Related Art

A sequential lateral solidification (SLS) method is used in a laser crystallization method, which is one method of crystallizing a silicon layer. The SLS method takes advantage of the fact that silicon grains grow laterally from the boundary between liquid phase silicon and solid phase silicon. A process crystallizing a silicon layer using the SLS method will be described hereinafter.

First, a first laser beam, which has an energy density completely melting the corresponding portion of a silicon layer, irradiates the silicon layer. The silicon layer exposed to the first laser beam is melted and then solidified. At this time, the first silicon grains grow laterally from the boundary between a liquid phase silicon region and a solid phase silicon region.

Next, the silicon layer is moved a distance, which is smaller than the silicon grain length formed by the shot of the first laser beam, and a second laser beam, which has the same energy density as the first laser beam, is irradiated on the silicon layer. The silicon layer exposed to the second laser beam is melted, and then second silicon grains grow in the same manner as with the first laser beam irradiation.

When the second silicon grains grow, the first silicon grains act as seeds of crystallization at the boundary between liquid phase silicon and solid phase silicon and grow laterally. Thus, the silicon grains grow in the direction that the laser beam moves.

As stated above, silicon grains having expected sizes are formed by repeatedly performing silicon crystallizing processes, where the silicon layer is moved, the laser beam is irradiated, and the silicon layer is melted and crystallized, n (n is a positive integer) times. The silicon grains grow laterally, i.e., in the scanning direction of the laser beam, from the first forming portion. Therefore, silicon grains of large sizes may be obtained.

The SLS method has a difference in the fact that the laser beam is patterned so as to have the fixed width and the fixed form from other laser crystallizing methods. To do this, an apparatus for a laser crystallization process using the SLS method uses a mask for patterning the laser beam differently from other conventional apparatuses for a laser crystallization process.

FIG. 1 is a schematic view illustrating an apparatus for a laser crystallization process using a SLS method. In FIG. 1, an apparatus for a laser crystallization process using a SLS method includes a laser beam source 10, an attenuator 11, a homogenizer 12, a field lens 13, a laser beam mask 14, an object lens 15 and a process chamber 20 having a translation stage 16. To irradiate a laser beam on a silicon thin film after patterning the laser beam in a fixed shape, an original laser beam naturally emitted from the laser beam source 10 is controlled passing through the attenuator 11, the homogenizer 12, and the field lens 13, and then is condensed. The condensed laser beam is patterned to have the fixed form through a beam pattern mask 14. The patterned laser beam passes through the object lens 15 and is irradiated on the silicon thin film 17 formed on the translation stage 16 in the process chamber 20. Because a silicon layer is generally formed on a substrate in a liquid crystal display device, the silicon layer and the substrate may be referred to all together as a silicon substrate. In FIG. 1, mirrors 19a, 19b and 19c control the path of the laser beam. The beam pattern mask 14 of the related art may be easily damaged, and thus the process yield may be reduced.

SUMMARY OF THE INVENTION

Accordingly, the present invention is directed to a mask for laser irradiation, a method of manufacturing the same, and an apparatus for laser crystallization using the same that substantially obviates one or more of these problems due to limitations and disadvantages of the related art.

An advantage of the present invention is to provide a mask for laser irradiation preventing damage to the mask, a method of manufacturing the same, and an apparatus for laser crystallization using the same.

Another advantage of the present invention is to provide a mask for laser irradiation having a high process yield by increasing intensity and repetition rate of a laser beam without damage to the mask.

Another advantage of the present invention is to provide a mask for laser irradiation that may be applied to an apparatus for crystallization using a high intensity laser beam.

Additional features and advantages of the invention will be set forth in the description that follows, and in part, will be apparent from the description, or may be learned by practice of the invention. The objectives and other advantages of the invention will be realized and attained by the structure particularly pointed out in the written description and in the claims and appended drawings.

To achieve these and other advantages, and in accordance with the purpose of the present invention, as embodied and broadly described, a mask for laser irradiation includes a base substrate, a laser beam shielding pattern on a first surface of the base substrate, wherein the laser beam shielding pattern is made of an opaque metallic material and has laser beam transmitting portions spaced apart from each other, and an anti-thermal oxidation layer covering the laser beam shielding pattern, wherein a second surface of the base substrate is an incident surface of a laser beam.

In another aspect of the present invention, a method of manufacturing a mask for laser irradiation includes steps of forming a laser beam shielding pattern on a first surface of a base substrate by using an opaque metallic material, wherein the laser beam shielding pattern has laser beam transmitting portions spaced apart from each other, and forming an anti-thermal oxidation layer covering the laser beam shielding pattern, wherein a second surface of the base substrate is an incident surface of a laser beam.

In another aspect of the present invention, an apparatus for crystallization of amorphous silicon includes a laser beam source emitting a laser beam, an attenuator that adjusts an intensity of the laser beam, a homogenizer that adjusts an uniformity of the laser beam, a mask including a base substrate, a laser beam shielding pattern on a first surface of the base substrate, wherein the laser beam shielding pattern is made of an opaque metallic material and has laser beam transmitting portions spaced apart from each other, and an anti-thermal oxidation layer covering the laser beam shielding pattern, wherein a second surface of the base substrate is an incident surface of a laser beam, and a translation stage which the amorphous silicon is loaded on.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, which is illustrated in the accompanying drawings.

Figure 1:
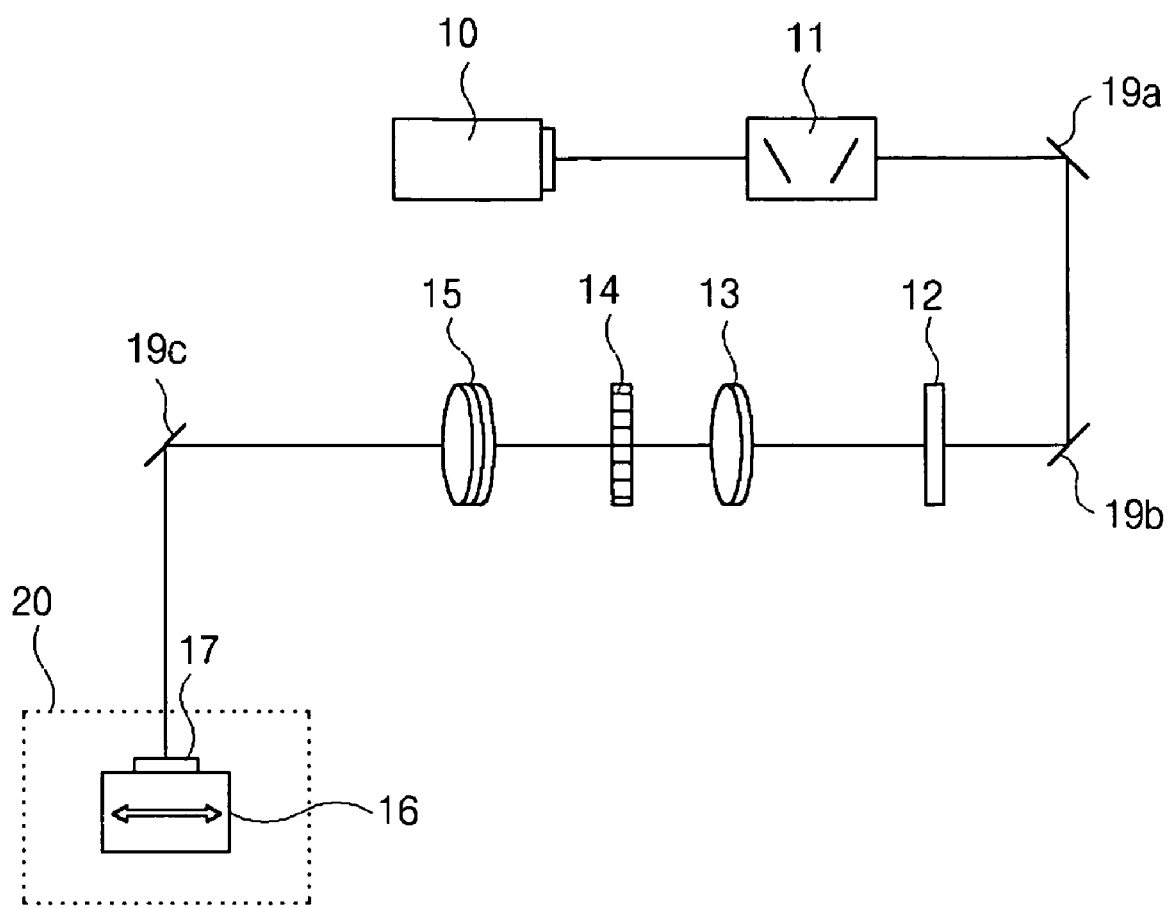
FIG. 1 is a schematic view illustrating an apparatus for a laser crystallization process using a sequential lateral solidification (SLS) method.
Figure 2:
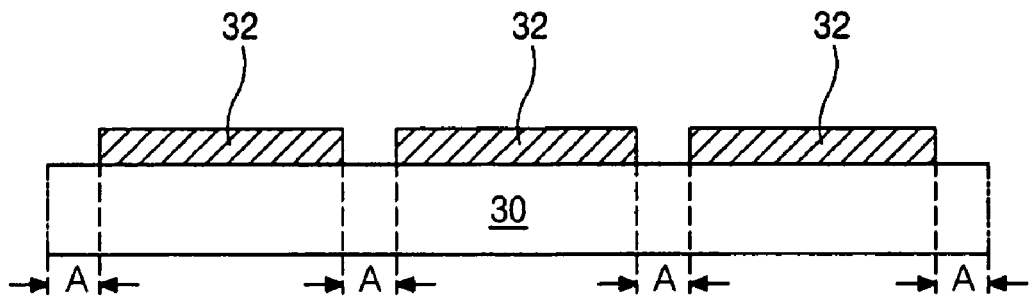
FIG. 2 is a schematic view showing a cross-sectional structure of a laser beam pattern mask according to the related art.

FIG. 2 is a schematic view showing a cross-sectional structure of a laser beam pattern mask according to the related art. In FIG. 2, laser beam shielding patterns 32 are formed on a base substrate 30, spaced apart from each other. Spaces between the laser beam shielding patterns 32 correspond to laser beam transmitting portions A. The base substrate 30 may be made of quartz having high transmittance and the laser beam shielding patterns 32 may be made of an opaque metallic material, such as chromium (Cr) or aluminum (Al).

Figure 3:
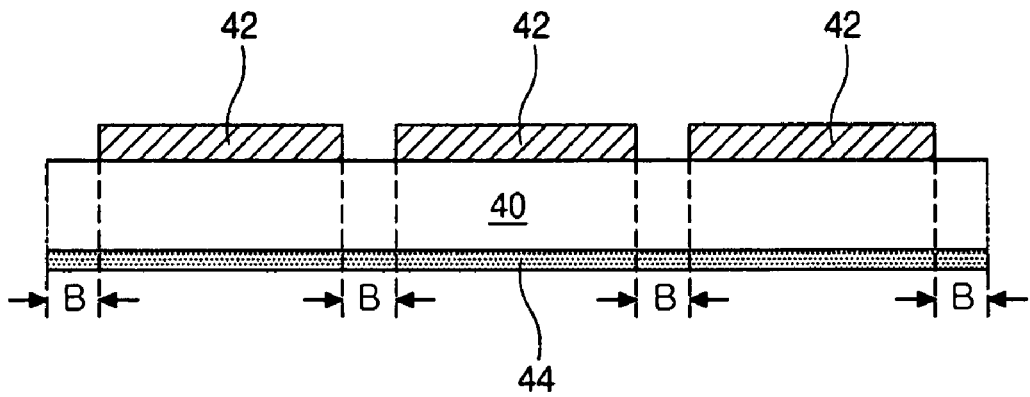
FIG. 3 is a schematic view showing a cross-sectional structure of another laser beam pattern mask according to the related art.

FIG. 3 is a schematic view showing a cross-sectional structure of another laser beam pattern mask according to the related art. As shown in the figure, laser beam shielding patterns 42 are formed on one surface of a base substrate 40, separated by laser beam transmitting portions B and spaced apart from each other. An anti-reflection layer 44 is formed on the other surface of the base substrate 40, i.e., on the incident surface of the laser beam.

The anti-reflecting layer 44 minimizes reflectance at the incident surface of the base substrate 40 and is formed through a coating method using an organic material as a target, wherein the organic material has a high transmittance for the wavelength of the laser beam.

During a laser crystallization process using the laser beam mask according to the related art, some of the laser beam is transmitted through the laser beam transmitting portions A or B and the rest of the laser beam is absorbed into the laser beam shielding patterns 32 or 42. Accordingly, the absorption of the laser beam may cause some damage to the laser beam shielding patterns 32 or 42. In addition, because the laser beam shielding patterns of the laser beam pattern masks of FIG. 2 and FIG. 3 are exposed to the air, the metallic material directly contacts oxygen in the air, and thus the opaque metallic material of the laser beam shielding patterns 32 or 42 may be thermally oxidized due to the high intensity of the laser beam. The thermally oxidized or expanded laser beam shielding patterns may considerably decrease the ability of the shielding patterns to block the laser beam and decrease the adhesion to the base substrate. Meanwhile, when the thermal oxidization of the opaque metallic material is severe, the opaque metallic material vaporized into particles. These particles may attach to the laser beam transmitting portions A or B to reduce the intensity and/or the uniformity of the laser beam. Accordingly, frequent maintenance such as cleaning of the laser beam mask and changing of gases for the laser source is necessary, thereby reducing process yield. Moreover, as the intensity and repetition rate of the laser beam become higher, the damage to the laser beam mask and the reduction of the process yield become more severe.

Figure 4:
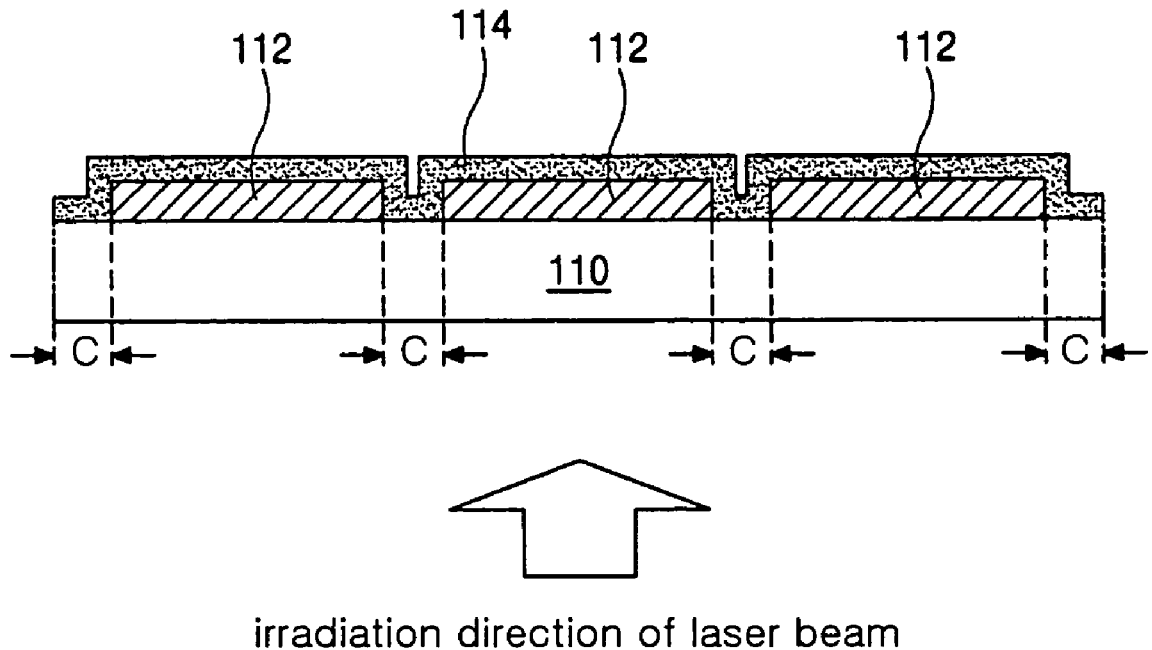
FIG. 4 is a schematic cross-sectional view illustrating a mask for laser irradiation according to a first embodiment of the present invention.

FIG. 4 is a schematic cross-sectional view illustrating a mask for laser irradiation according to a first embodiment of the present invention. In FIG. 4, laser beam shielding patterns 112 are formed on a base substrate 110, spaced apart from each other. Spaces between the laser beam shielding patterns 112 may be defined as laser beam transmitting portions C. The laser beam shielding patterns 112 may form a single pattern and the laser beam transmitting portions C may be slits. The base substrate 110 may be made of a material having high transmittance and thermal resistance and may be formed of quartz. The laser beam shielding patterns 112 may be made of an opaque metallic material, such as chromium (Cr) or aluminum (Al).

An anti-thermal oxidation layer 114 is formed on the base substrate 110 and covers the laser beam shielding patterns 112. The anti-thermal oxidation layer 114 prevents the laser beam shielding patterns 112 from being exposed to the air. The anti-thermal oxidation layer 114 may be made of a material having high transmittance for the wavelength of the laser beam and may be formed through a coating method using an organic material, which has the above-mentioned characteristics. The coating method may select a reflective index of the organic material and adjust a thickness of the anti-thermal oxidation layer 114. Accordingly, the anti-thermal oxidation layer 114 may minimize reflectance.

Figure 5:
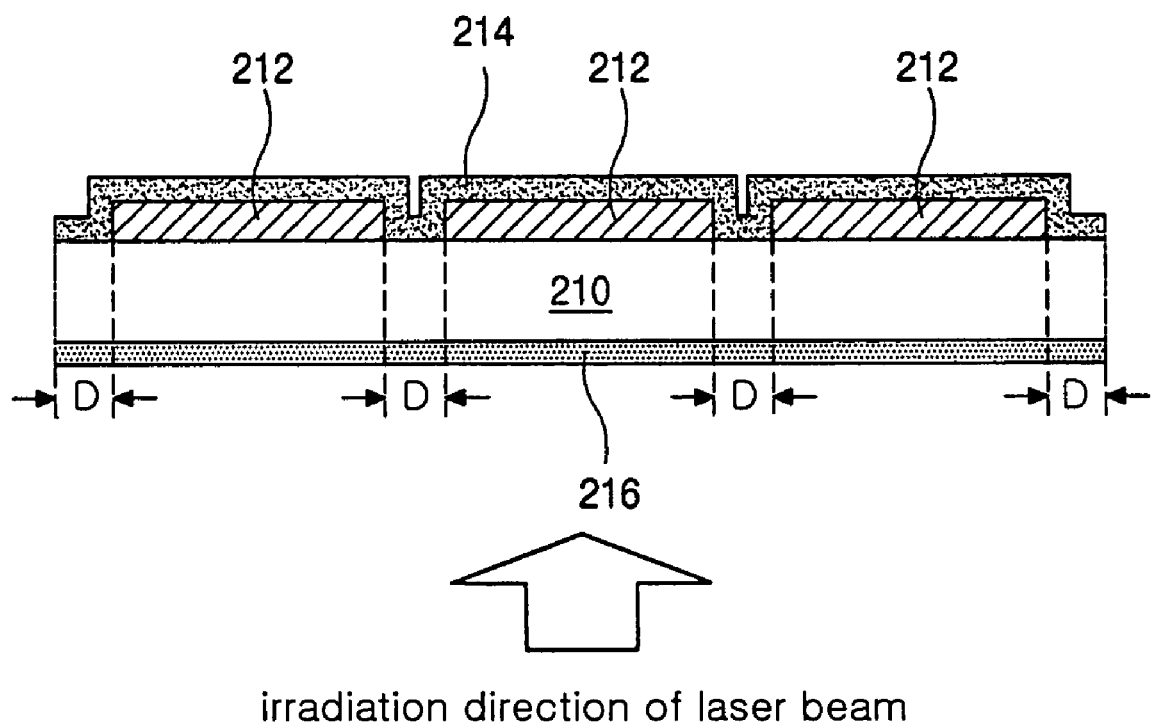
FIG. 5 is a schematic view illustrating a cross-sectional structure of a mask for laser irradiation according to a second embodiment of the present invention.

FIG. 5 is a schematic view illustrating a cross-sectional structure of a mask for laser irradiation according to a second embodiment of the present invention. In FIG. 5, laser beam shielding patterns 212 are formed on the upper surface of a base substrate 210, spaced apart from each other. Spaces between the laser beam shielding patterns 212 may be defined as laser beam transmitting portions D. The laser beam shielding patterns 212 may form a single pattern. An anti-thermal oxidation layer 214 is formed on the upper surface of the base substrate 210 and covers the laser beam shielding patterns 212. The anti-thermal oxidation layer 214 prevents the laser beam shielding patterns 212 from being exposed to the air.

An anti-reflecting layer 216 is formed on the bottom surface of the substrate 210, that is, on the incident surface of the laser beam. A laser beam may be emitted from a laser beam source (not shown) outside of the anti-reflecting layer 216, and then may pass through the anti-reflecting layer 216. The anti-reflecting layer 216 may minimize reflectance.

The base substrate 210 may be made of a material having high transmittance and thermal resistance, such as quartz. The laser beam shielding patterns 212 may be made of an opaque metallic material, such as chromium (Cr) or aluminum (Al). The anti-thermal oxidation layer 214 may be formed of an organic material, which may have a transmittance passband based upon the wavelength of the laser beam and can seal out oxygen in the air. The anti-thermal oxidation layer 214 may reduce reflectance of the laser beam similar to the anti-reflecting layer 216.

Figure 6A:
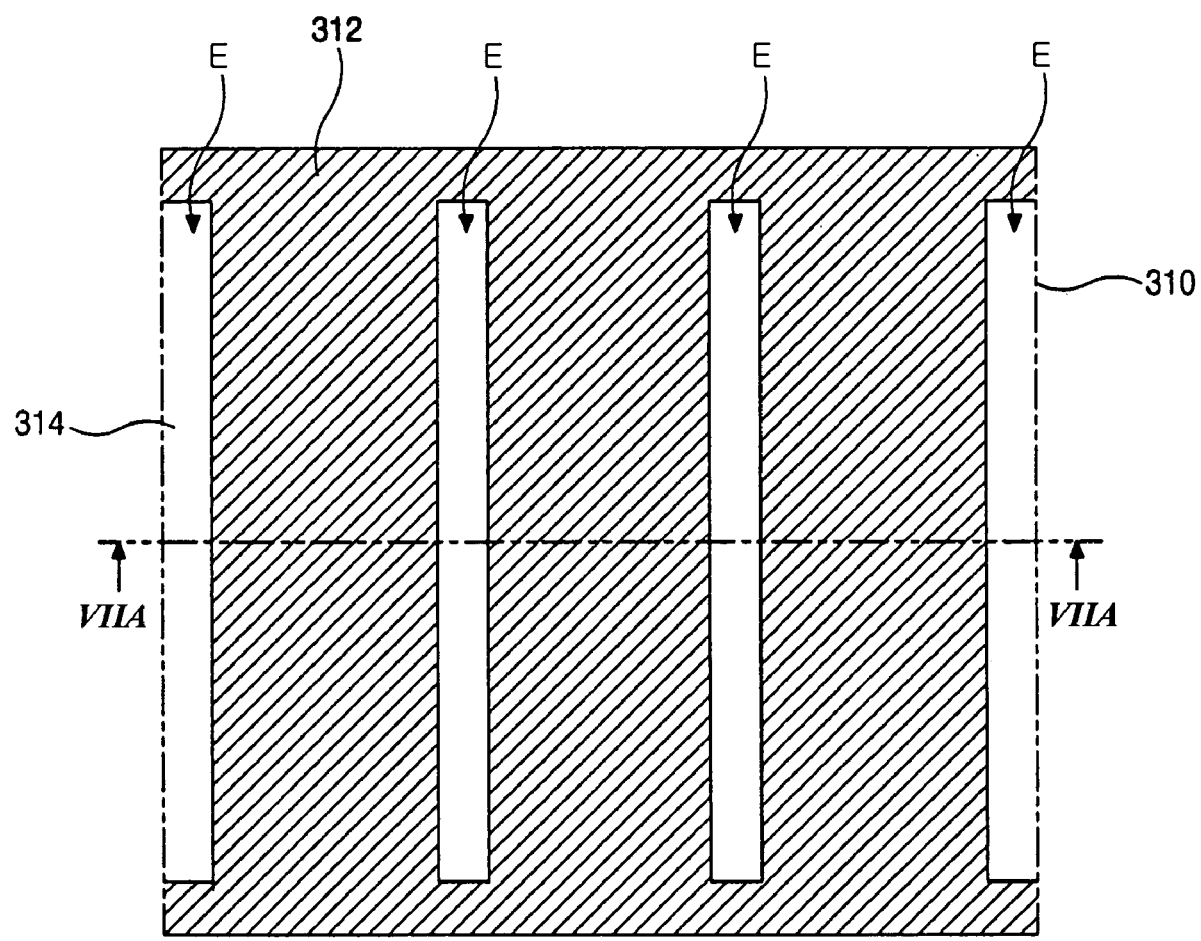
FIGS. 6A and 6B are plan views showing a method of manufacturing the mask for laser irradiation according to a third embodiment of the present invention.
Figure 6B:
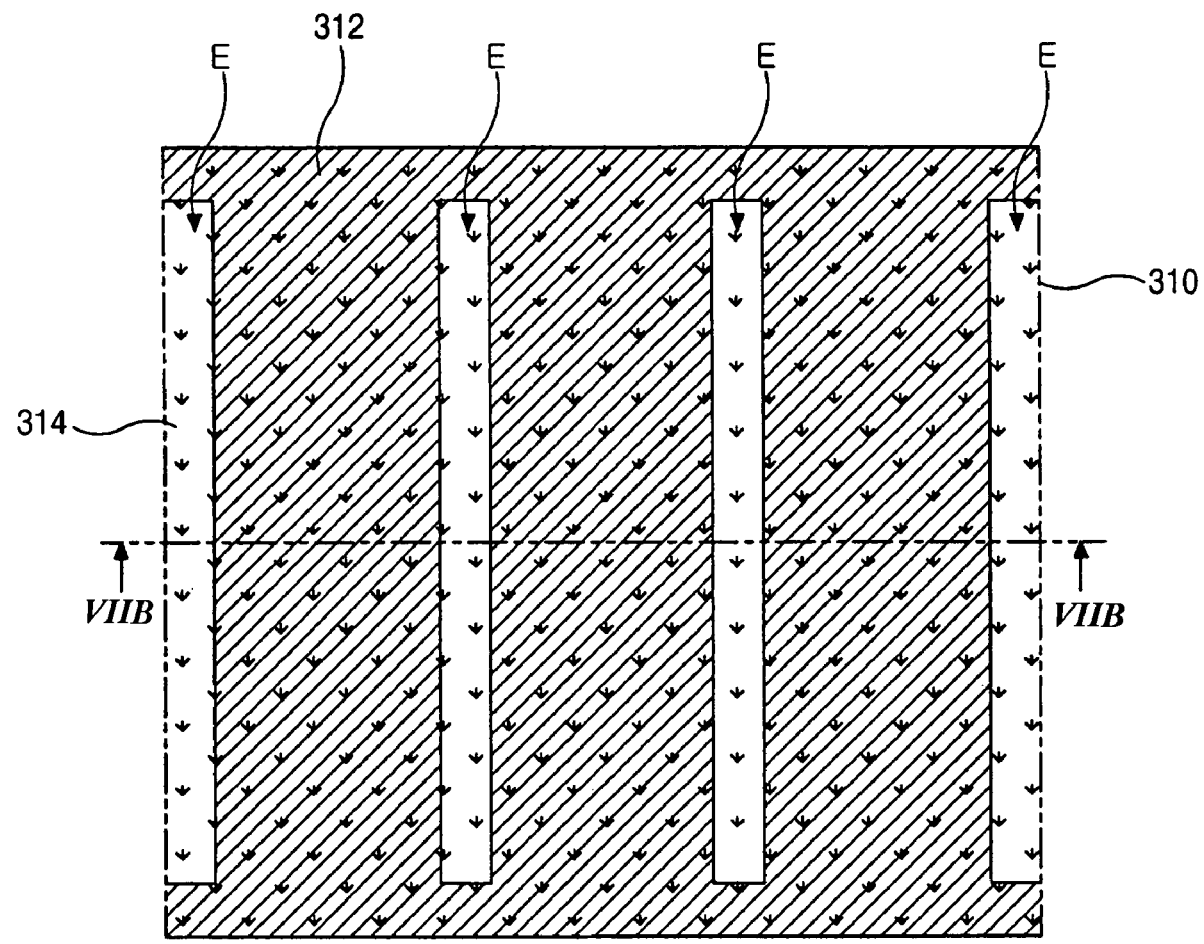
Figure 7A:
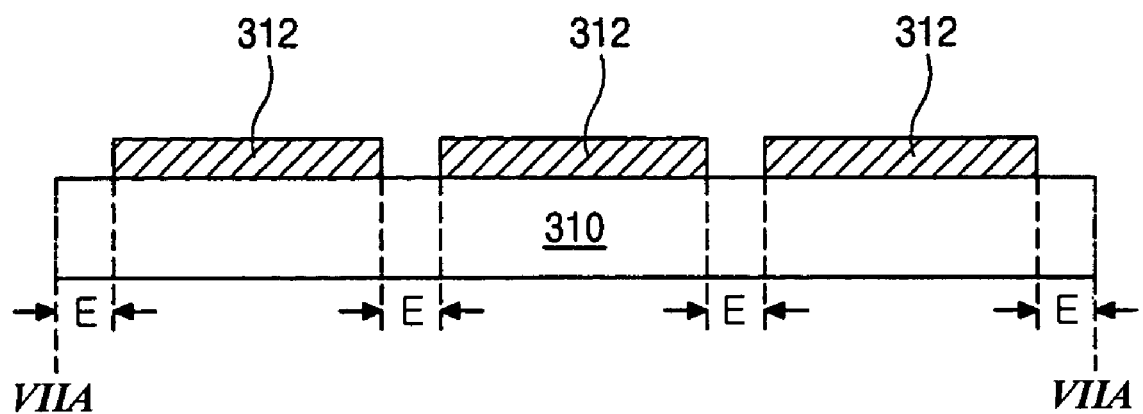
FIGS. 7A and 7B are cross-sectional views along the line VIIA—VIIA of FIG. 6A and the line VIIB—VIIB of FIG. 6B, respectively.
Figure 7B:
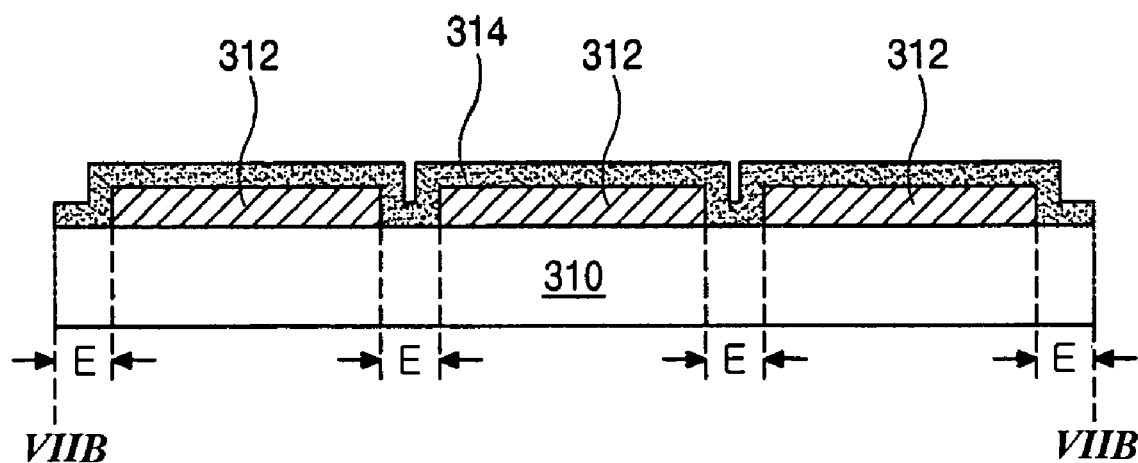

FIGS. 6A and 6B and FIGS. 7A and 7B illustrate a method of manufacturing a mask for laser irradiation according to a third embodiment of the present invention. FIGS. 6A and 6B are plan views showing the method of manufacturing the mask for laser irradiation according to the third embodiment of the present invention, and FIGS. 7A and 7B are cross-sectional views along the line VIIA—VIIA of FIG. 6A and the line VIIB—VIIB of FIG. 6B, respectively.

In FIGS. 6A and 7A, a laser beam shielding pattern 312 may be formed on a base substrate 310. The laser beam shielding pattern 312 includes laser beam transmitting portions E, which may be in the form, of a slit, but may have other shapes as well. The laser beam shielding pattern 312 may have a single pattern with a single slit.

Next, as shown in FIGS. 6B and 7B, an anti-thermal oxidation layer 314 is formed to cover the laser beam shielding pattern 312. The anti-thermal oxidation layer 314 may be made of an organic material having a transmittance passband that passes the wavelength of the laser beam and the organic material may additionally prevent the metallic material from the laser beam shielding pattern 312 from contacting oxygen in the air. For example, the anti-thermal oxidation layer 314 may be formed through a coating method wherein the organic material has a desired reflective index and thickness. In FIG. 7B, because the anti-thermal oxidation layer 314 entirely covers the laser beam shielding pattern 312, the laser beam shielding pattern 312 may be effectively prevented from contacting oxygen in the air.

Figure 8:
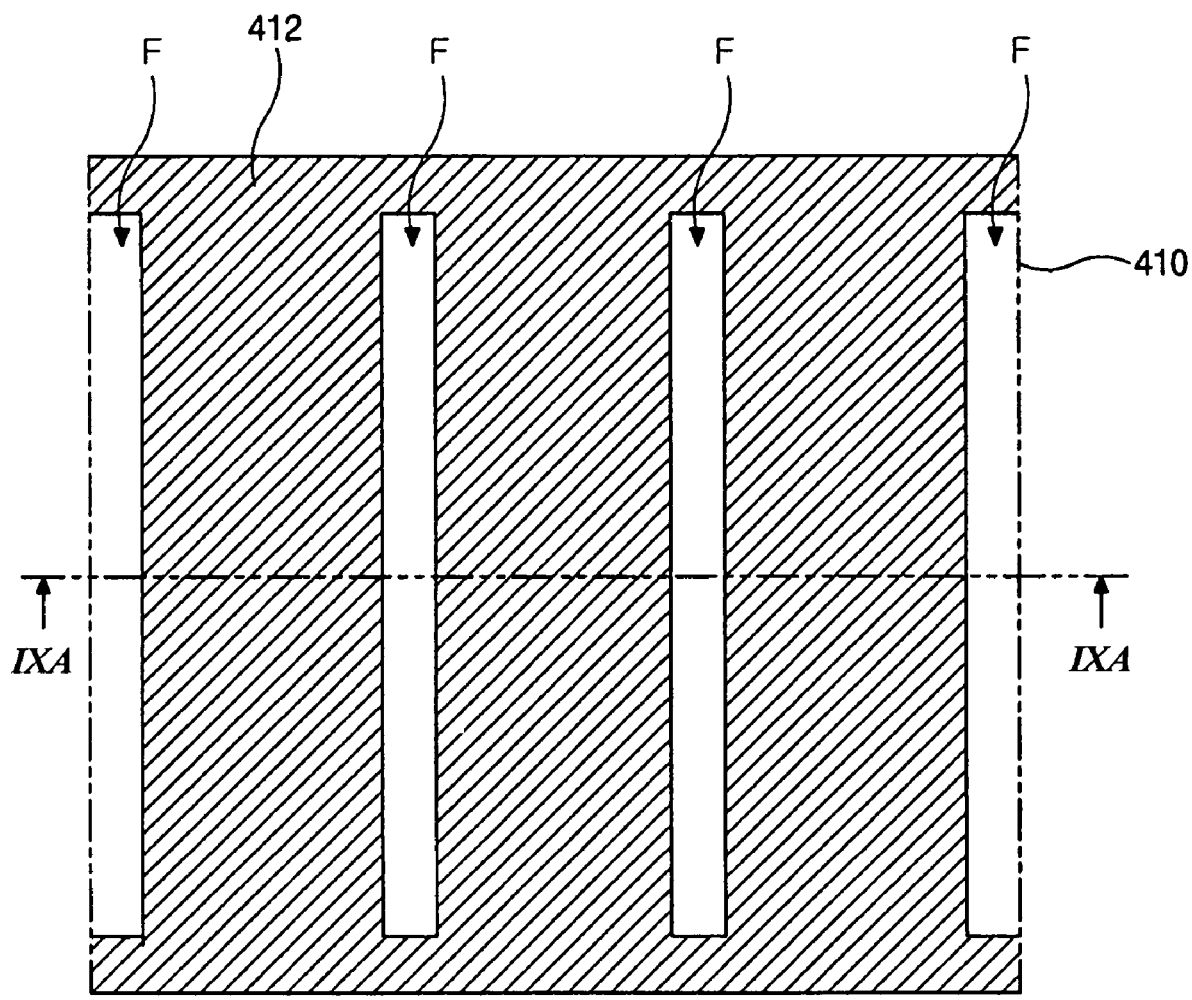
FIGS. 8A to 8C are plan views of showing a method of manufacturing the mask for laser irradiation according to a fourth embodiment of the present invention.
Figure 8:
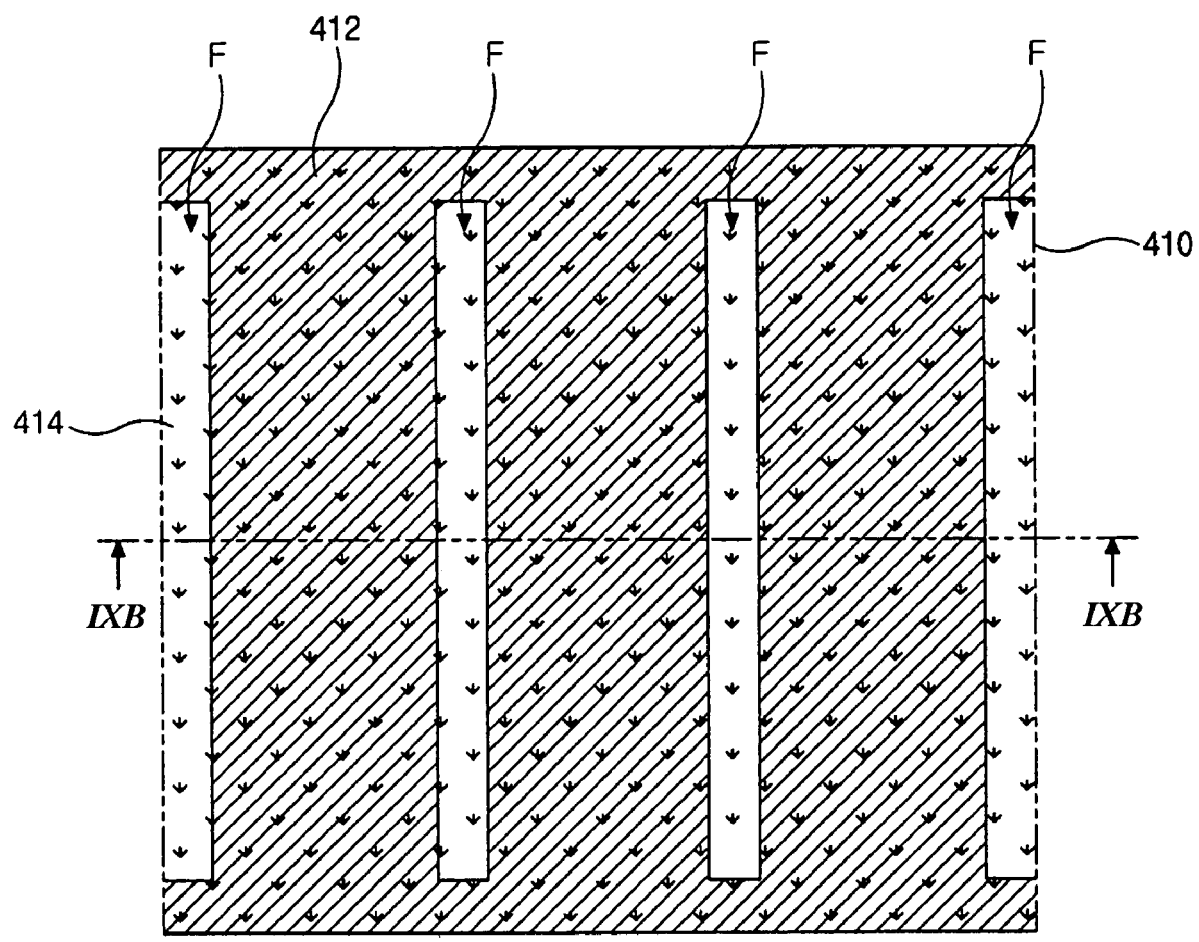
Figure 8:
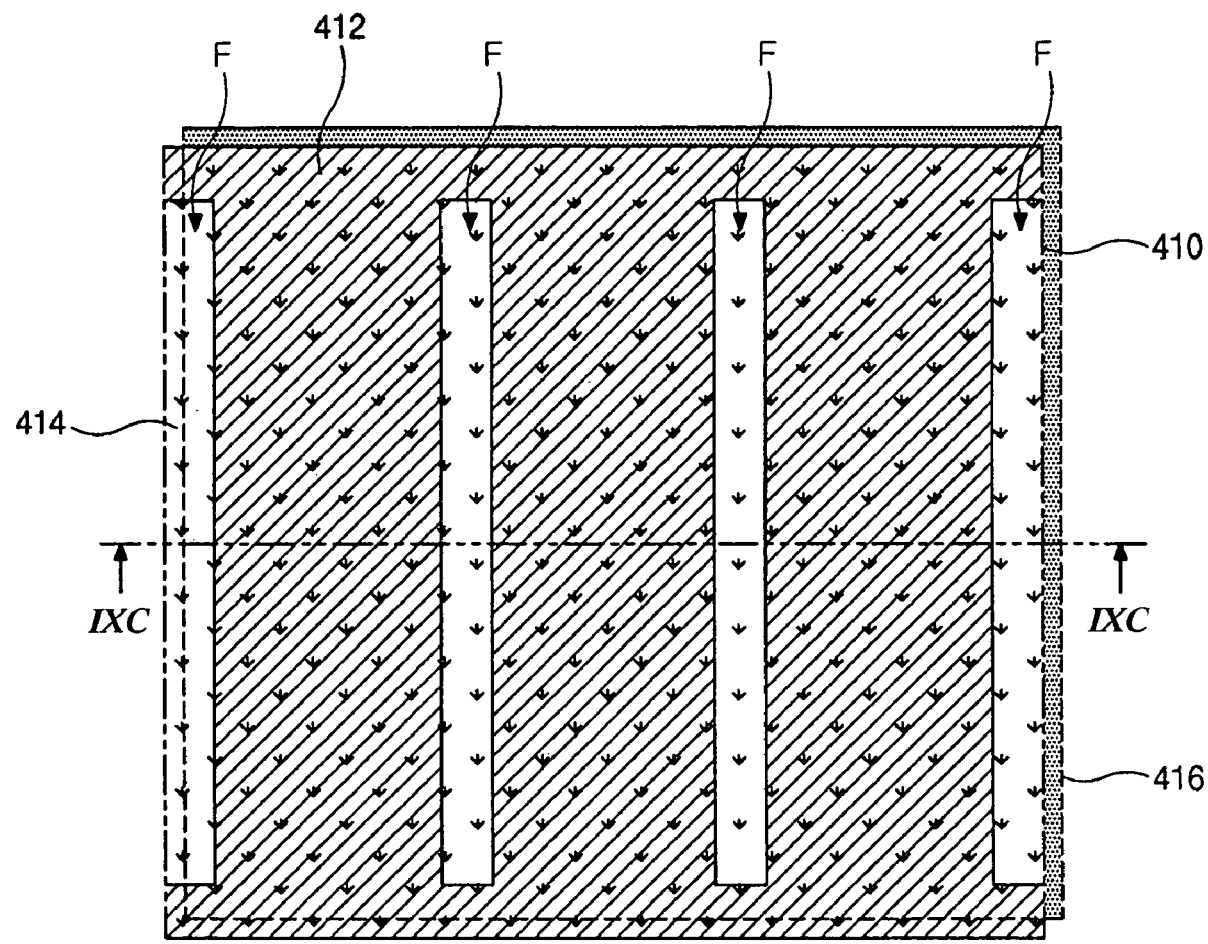
Figure 9:
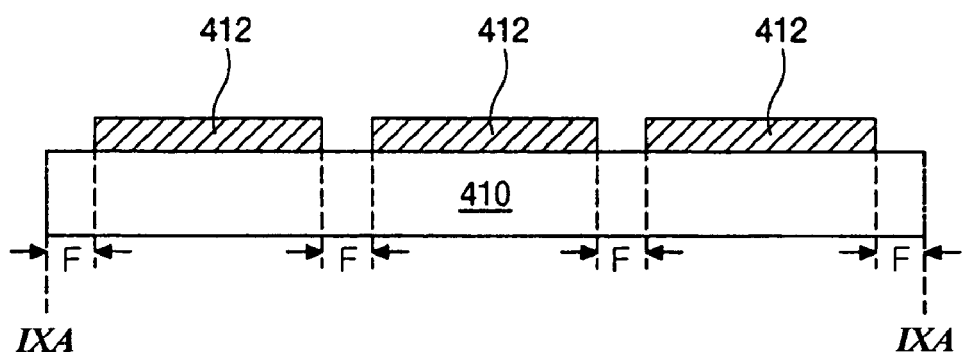
FIGS. 9A to 9C are cross-sectional views along the line IXA—IXA of FIG. 8A, the line IXB—IXB of FIG. 8B, and the line IXC—IXC of FIG. 8C, respectively.
Figure 9:
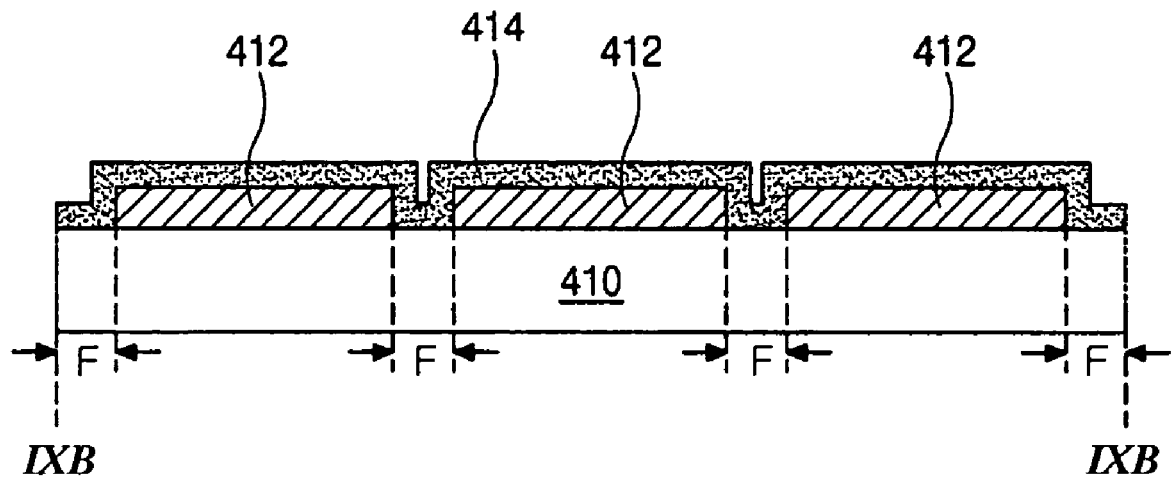
Figure 9:
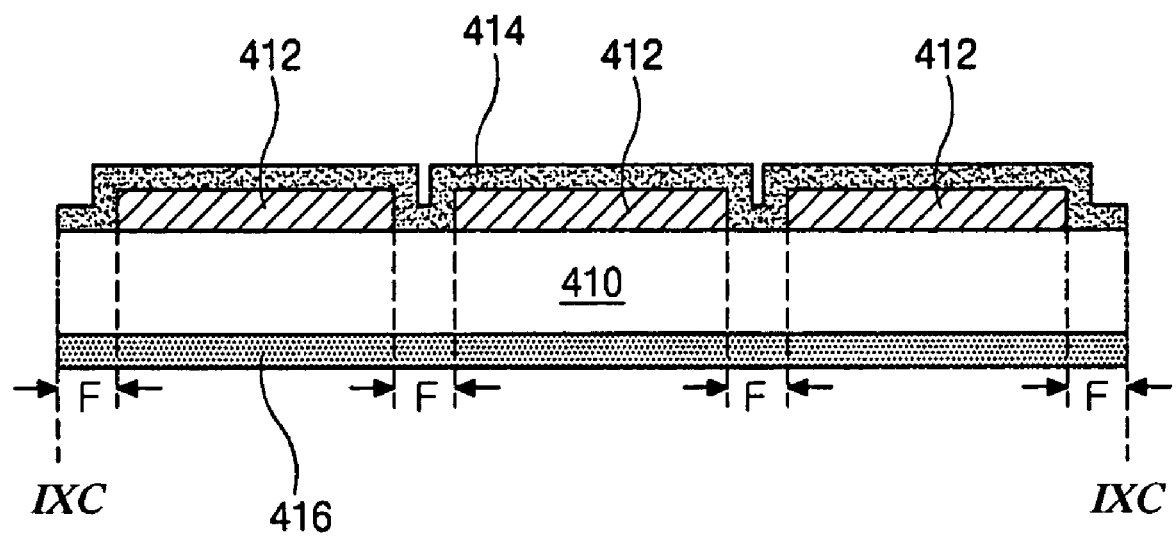

FIGS. 8A to 8C and FIGS. 9A to 9C illustrate a method of manufacturing a mask for laser irradiation according to a fourth embodiment of the present invention. FIGS. 8A to 8C are plan views showing the method of manufacturing the mask for laser irradiation according to the fourth embodiment of the present invention, and FIGS. 9A to 9C are cross-sectional views along the line IXA—IXA of FIG. 8A, the line IXB—IXB of FIG. 8B, and the line IXC—IXC of FIG. 8C, respectively.

In FIGS. 8A and 9A, a laser beam shielding pattern 412 is formed on a first surface of a base substrate 410. The laser beam shielding pattern 412 includes laser beam transmitting portions F spaced apart from each other, wherein the laser beam transmitting portions F may be slits and may have other shapes. The laser beam shielding pattern 412 may be a single pattern.

Next, as shown in FIGS. 8B and 9B, an anti-thermal oxidation layer 414 is formed to cover the laser beam shielding pattern 412. The anti-thermal oxidation layer 414 may be made of an organic material having a transmittance passband that passes the wavelength of the laser beam and the organic material may prevent a metallic material of the laser beam shielding pattern 412 from contacting oxygen in the air. For example, the anti-thermal oxidation layer 414 may be formed through a coating method wherein the organic material has a desired reflective index and thickness.

As shown in FIGS. 8C and 9C, an anti-reflecting layer 416 may be formed on a second surface of the substrate 410, that is, on the incident surface of the laser beam. The anti-reflecting layer 416 reduces the reflectance at the incident surface of the base substrate 410. The anti-reflecting layer 416 may be made of an organic material with a transmittance passband that passes the wavelength of the laser beam and may be formed through a coating method wherein the organic material has a desired reflective index and thickness.

In the present invention, damage to the laser beam shielding pattern of the mask are minimized, thereby increasing the energy density of the laser beam used to crystallize the silicon. In addition, because the repetition rate of the laser beam can increase, the productivity may be improved. Moreover, re-incidence of some of the laser beam, wherein light from the laser beam reflects from the lens after passing through the laser beam transmitting portion and comes back to the metallic material of the laser beam shielding pattern, may be prevented due to the anti-thermal oxidation layer. Therefore, optical characteristics are improved.

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

What is claimed is:

1. A mask for laser irradiation, comprising:
a base substrate;
a laser beam shielding pattern on a first surface of the base substrate, wherein the laser beam shielding pattern is made of an opaque metallic material and has laser beam transmitting portions spaced apart from each other; and
an anti-thermal oxidation layer covering the laser beam shielding pattern;
wherein a second surface of the base substrate is an incident surface of a laser beam.

2. The mask according to claim 1, wherein the anti-thermal oxidation layer has a passband that passes the wavelength of the laser beam.

3. The mask according to claim 1, further comprising an anti-reflecting layer on the second surface of the base substrate.

4. The mask according to claim 3, wherein the anti-reflecting layer has a passband that passes the wavelength of the laser beam.

5. The mask according to claim 1, wherein the laser beam transmitting portions have slit shapes.

6. The mask according to claim 1, wherein the laser beam shielding pattern forms a single pattern.

7. The mask according to claim 1, wherein the anti-thermal oxidation layer includes an organic material.

8. The mask according to claim 1, wherein the anti-thermal oxidation layer reduces reflectance of a laser beam.

9. The mask according to claim 1, wherein the base substrate includes quartz.

10. A method of manufacturing a mask for laser irradiation, comprising:
forming a laser beam shielding pattern on a first surface of a base substrate by using an opaque metallic material, wherein the laser beam shielding pattern has laser beam transmitting portions spaced apart from each other; and
forming an anti-thermal oxidation layer covering the laser beam shielding pattern;
wherein a second surface of the base substrate is an incident surface of a laser beam.

11. The method of claim 10, wherein the anti-thermal oxidation layer has a passband that passes the wavelength of laser beam.

12. The method according to claim 10, further comprising a step of forming an anti-reflecting layer on the second surface of the base substrate.

13. The method of claim 12 wherein, the anti-reflecting layer has a passband that passes the wavelength of the laser beam.

14. The method according to claim 12, wherein the anti-reflecting layer includes an organic material.

15. The method according to claim 14, wherein the anti-reflecting layer is formed through a coating method, wherein the anti-reflecting layer has a desired reflective index and thickness.

16. The method according to claim 10, wherein the anti-thermal oxidation layer reduces reflectance of a laser beam.

17. The method according to claim 16, wherein the anti-thermal oxidation layer is formed through a coating method, wherein the anti-thermal oxidation layer has a desired reflective index and thickness.

18. An apparatus for crystallization of amorphous silicon, comprising:
a laser beam source emitting a laser beam;
an attenuator that adjusts an intensity of the laser beam;
a homogenizer that adjusts a uniformity of the laser beam;
a mask including:
a base substrate;
a laser beam shielding pattern on a first surface of the base substrate, wherein the laser beam shielding pattern is made of an opaque metallic material and has laser beam transmitting portions spaced apart from each other; and
an anti-thermal oxidation layer covering the laser beam shielding pattern;
wherein a second surface of the base substrate is an incident surface of a laser beam; and
a translation stage on which the amorphous silicon is loaded.

19. The apparatus according to claim 18, wherein the anti-thermal oxidation layer has a passband that passes the wavelength of the laser beam.

20. The apparatus according to claim 18, wherein the mask further includes an anti-reflecting layer on the second surface of the base substrate.

21. The apparatus according to claim 20, wherein the anti-reflecting layer has a passband that passes the wavelength of the laser beam.

22. The apparatus according to claim 18, wherein the laser beam transmitting portions have slit shapes.

23. The apparatus according to claim 18, wherein the anti-thermal oxidation layer includes an organic material.

24. The apparatus according to claim 18, wherein the anti-thermal oxidation layer reduces reflectance of a laser beam.

* * * * *